United States Patent [19]

Kato et al.

[11] Patent Number: 5,246,272
[45] Date of Patent: Sep. 21, 1993

[54] BABY CARRIAGE OR THE LIKE INCLUDING RECLINING OR COLLAPSING MECHANISM

[75] Inventors: Hitoshi Kato; Yuichi Arai, both of Tokyo, Japan

[73] Assignee: Combi Corporation, Tokyo, Japan

[21] Appl. No.: 761,146

[22] Filed: Sep. 17, 1991

[30] Foreign Application Priority Data

Oct. 5, 1990 [JP] Japan .................................. 2-266673

[51] Int. Cl.⁵ .............................................. B60N 2/02
[52] U.S. Cl. ................................ 297/364; 297/378.1; 297/354.12
[58] Field of Search .............. 297/364, 363, 355, 378, 297/365, 379, 149, 151, 153; 292/33, 36

[56] References Cited

U.S. PATENT DOCUMENTS

| | | | |
|---|---|---|---|
| 1,089,941 | 3/1914 | Miley | 292/36 |
| 1,174,652 | 3/1916 | Banks | 292/36 |
| 1,319,011 | 10/1919 | Kuretich | 292/36 |
| 2,515,261 | 7/1950 | Poskin | 297/364 |
| 3,115,365 | 12/1963 | Hershberger et al. | 297/364 X |
| 4,593,950 | 6/1986 | Infanti | 297/442 X |
| 4,938,603 | 7/1990 | Turner et al. | 297/379 X |
| 4,968,092 | 11/1990 | Giambrone | 297/151 |

Primary Examiner—Kenneth J. Dorner
Assistant Examiner—Milton Nelson, Jr.
Attorney, Agent, or Firm—Sughrue, Mion, Zinn, Macpeak & Seas

[57] ABSTRACT

A mechanism for a seat portion of a baby carriage, the seat portion including a seat floor and a back rest disposed at a rear portion of the seat floor, the mechanism including a pair of operating links, each having a central portion which is swingably pivoted to a lower end of a central portion disposed inside of the back rest; engaging rods pivoted to ends of the operating links such that the engaging rods swing in a horizontal direction in accordance with a swinging operation of the operating links; a pair of receiving plates respectively disposed on both ends of the seat floor, each of the receiving plates having several spaced fitting holes for selectively receiving ends of the engaging rods so as to provide a reclining operation of the seat portion; and a swing operating plate attached to a lower end portion of the back rest so as to be freely lifted, upper ends of the two operating links being pivoted to the swing operating plate.

5 Claims, 5 Drawing Sheets

BABY CARRIAGE OR THE LIKE INCLUDING RECLINING OR COLLAPSING MECHANISM

FIELD OF THE INVENTION

The present invention relates to a mechanism for providing a reclining and/or collapsing operation for a baby carriage or the like, and more particularly, to such mechanism which is constructed such that a seat portion for seating a baby can be detachably attached to the main body of the baby carriage.

BACKGROUND OF THE INVENTION

Baby carriages of the type provided with a so-called reclining mechanism capable of freely changing the relative angle of a seat portion, i.e., seat floor and back rest, or for folding the seat portion in connection with a folding operation of the baby carriage's main body are known.

Recently, such a baby carriage has been manufactured in such a way that the main body thereof can be separated from the seat portion, and only the seat portion for the baby can be carried as desired. With such a baby carriage, the seat portion associated with the folding operation of the main body is collapsible to a compact form.

However, with such baby carriages, the seat portion has been folded within a collapsible range of the back rest standing from the rear end of the seat floor, so that the seat portion with the back rest standing as straight as possible may be accommodated in the main body of the baby carriage.

Since the back rest and the seat floor cannot be folded nor accommodated in the main body of the baby carriage with the back rest drawn near to the seat floor so that the back rest is superposed on the seat floor, the whole configuration of the folded baby carriage is not as compact as possible.

SUMMARY OF THE INVENTION

The present invention was developed in order to overcome the above-mentioned problems.

An object of the present invention is to provide a mechanism for providing a reclining and/or collapsing operation for a baby carriage or the like in which all mechanisms for providing the reclining and/or collapsing operation(s) are formed in the seat portion of the baby carriage so that the reclining operation and/or the collapsing operation for folding the seat portion can be freely performed without being influenced by the operation of the baby carriage's main body.

Another object of the present invention is to provide a mechanism for reclining and/or collapsing a baby carriage in which a back rest standing at the rear end of the seat floor can be not only freely reclined backward from a standing position, but also made collapsible forward (toward a seat floor) from the standing position so that the seat portion may be folded to a standing position and so that the seat portion may be folded to a compact form in association with the folding operation of the baby carriage's main body.

The mechanism according to the present invention includes a back rest standing at the rear portion of a seat floor so as to be collapsible forward and backward, two operating links each of which is formed in an L shape and has a central portion pivoted to the lower end of a central portion inside the back rest, engaging rods pivoted to the lower ends of the operating links which swing in a horizontal direction in accordance with the swinging of the operating links, several fitting holes formed with proper spaces for a reclining operation or notch portions formed for a folding operation at both sides of the seat floor into which the outer ends of the engaging rods can be selectively fitted so as to be attachable thereto and detachable therefrom, and a swing operating plate attached to a position near to the lower end portion of the back rest so as to be freely lifted, the upper ends of the two operating links being pivoted to the swing operating plate so that the back rest can be freely collapsible to forward and backward positions of the seat floor.

DETAILED DESCRIPTION OF A PREFERRED EMBODIMENT

Figure 1:
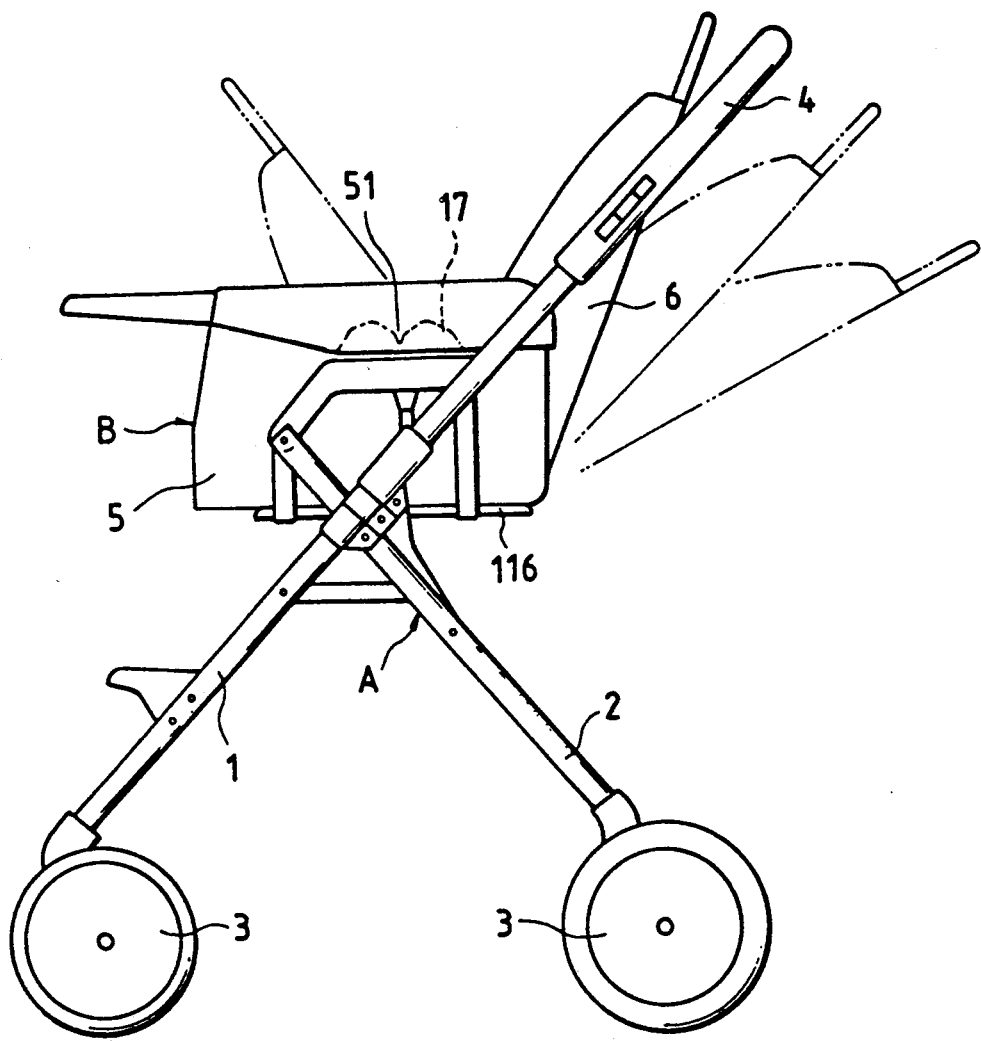
FIG. 1 is a side view of a baby carriage showing reclining conditions of a back rest according to the invention.

Referring to the accompanying drawings, an embodiment of the present invention will now be described.

A baby carriage illustrated in the drawings comprises the combination of a main body A and a seat portion B detachably attached to the main body A. A reclining mechanism or collapsing mechanism of the present invention is attached to the seat portion B.

As shown in FIG. 1, the main body A of the baby carriage comprises a body including front leg rods 1 and rear leg rods 2 which are provided with wheels 3, 3 at their lower end portions. The upper end portions of the leg rods 1 and 2 criss-cross. A hand push rod 4 is connected to the upper ends of the front leg rods 1 so as to be collapsible.

The seat portion B includes a seat floor 5 and a back rest 6 attached to the rear end of the seat floor 5 so as to be freely reclined and collapsible. The lower face of the seat floor 5 is mounted on a receiving plate 116 formed in the main body A. Engaging shafts 51 and 51 formed at both sides of the seat floor 5 are engaged and mounted on engaging portions 17 and 17 formed on the side faces of the receiving plate 116.

Figure 4:
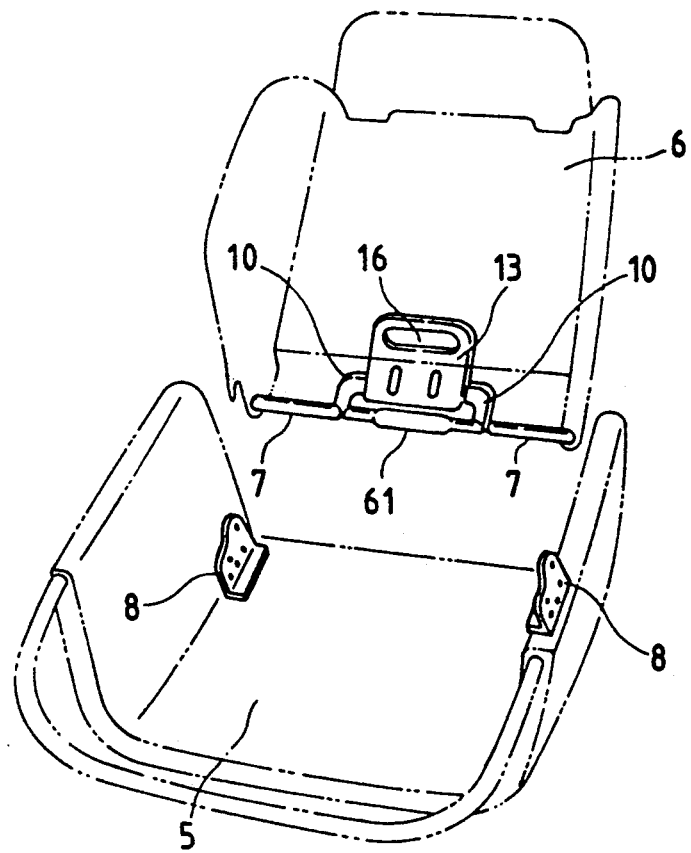
FIG. 4 is a perspective view showing a mounting portion of a reclining mechanism according to the invention.

As shown in FIG. 4, two engaging rods 7 and 7 are attached to the lower end of the back rest 6 so as to reciprocate along the direction of the width of the back rest 6. The outer ends 71 and 71 (FIG. 5) of the two engaging rods 7 and 7 can be selectively fitted into several holes 81...81 for a reclining operation or notch portions 82 for a folding operation. The holes 81 and notch 82 are formed on upright receiving plates 8 provided at both sides of the seat floor 5.

The notch portions 82 may be changed to fitting holes for a folding operation.

Although the receiving plates 8 independently stand at both side ends inside the floor seat 5 in this embodiment, it is not necessary to limit the structure thereto. For example, for achieving the purpose of this embodiment, fitting holes 81...81 for a reclining operation and notch portions 82 may be directly formed on both side wall faces of the seat floor 5.

Figure 5:
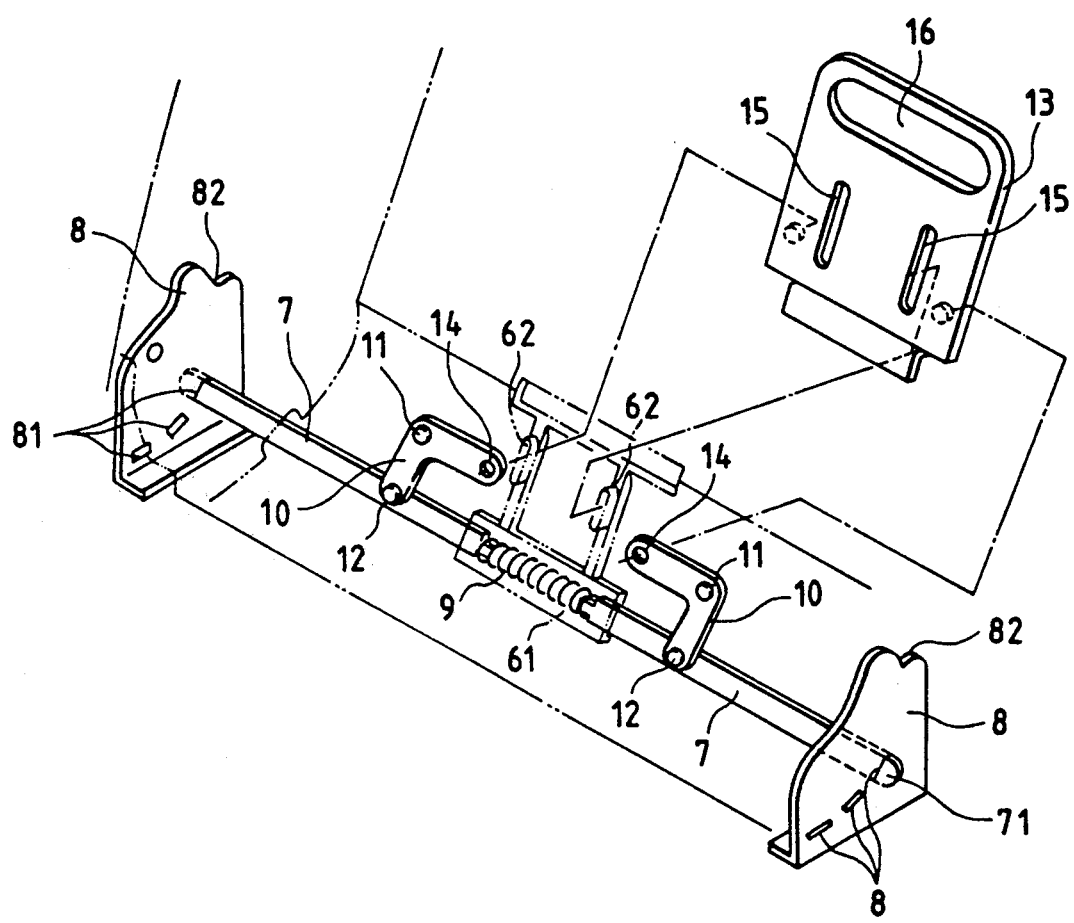
FIG. 5 is an exploded perspective view of the main components of the mechanism according to the invention.
Figure 6:
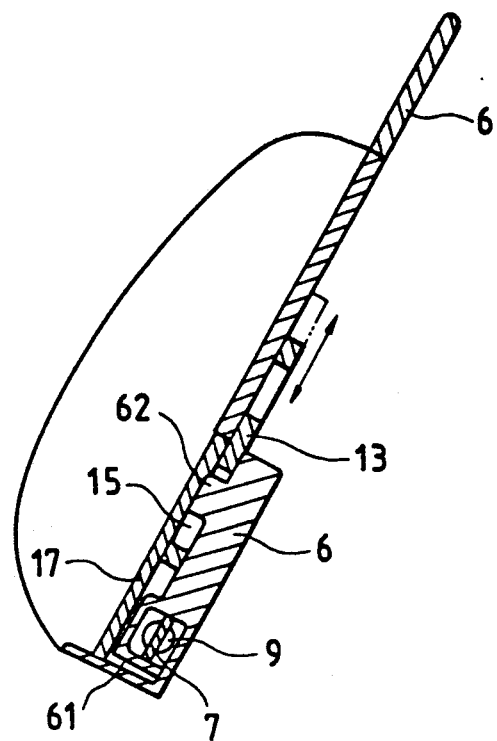
FIG. 6 is a side view of a longitudinal section taken on a center portion of FIG. 4, FIG. 7($a$) is a front view showing the end portions of engaging rods fitted into and engaged with receiving plates according to the invention, and FIG. 7($b$) is a front view showing that the fitting of the end portions of the engaging rods into the receiving plates is released.

As shown in FIG. 5, a pressing spring 9 is interposed between the inner side ends of the engaging rods 7 and 7 and accommodated in casing 61 (FIG. 4) under a compressed state so as to normally exert a force (force directed to engaging positions) which presses outward on the engaging rods 7 and 7 which are placed in contact therewith.

Operating links 10 and 10 serve to swing the engaging rods 7 and 7. The bent portions of the operating links 10 and 10 which are L-shaped in front configurations are swingably pivoted to portions 11 and 11 on the back seat 6. The lower portions of the pivoted portions 11 and 11 are attached to portions 12 and 12 near inner side ends of the engaging rods 7 and 7. The upper portions of the pivoted portions 11 and 11 are pivoted to portions 14 and 14 on a swing operating plate 13.

It is not necessary to limit the structure of the operating links 10 and 10 for swinging the engaging rods 7 and 7 to the illustrated L-shaped structure. Any structure may be applicable in which the engaging rods 7 and 7 can be swung in a horizontal direction in association with the vertical movement of the swing operating plate 13.

The swing operating plate 13 is attached to a portion near to the lower end of the back rest 6 so as to be freely lifted. Guiding protrusions 62 and 62 protruding on the back rest 6 are fitted into fitting holes 15 and 15 longitudinally formed on the swing operating plate 13 so that an accurate lifting operation of the swing operating plate can be performed.

An operating hole 16 is formed on the upper end portion of the swing operating plate 13, and therefore the upper end portion of the operating plate can be held by inserting an operator's hand thereinto when the swing operating plate 13 is moved upward or downward.

As illustrated in FIGS. 3 to 6, the lower end portion of the swing operating plate 13 is located inside of the lower end portion of the back rest 6. The upper end portion of the swing operating plate is mounted so as to be exposed outside of the back rest 6.

A cover plate 17 is attached to a lower end portion inside of the back rest 6 so as to prevent contact of the baby's body with various mechanisms mounted inside the back rest 6.

The operation of the present invention will now be described.

Figure 2:
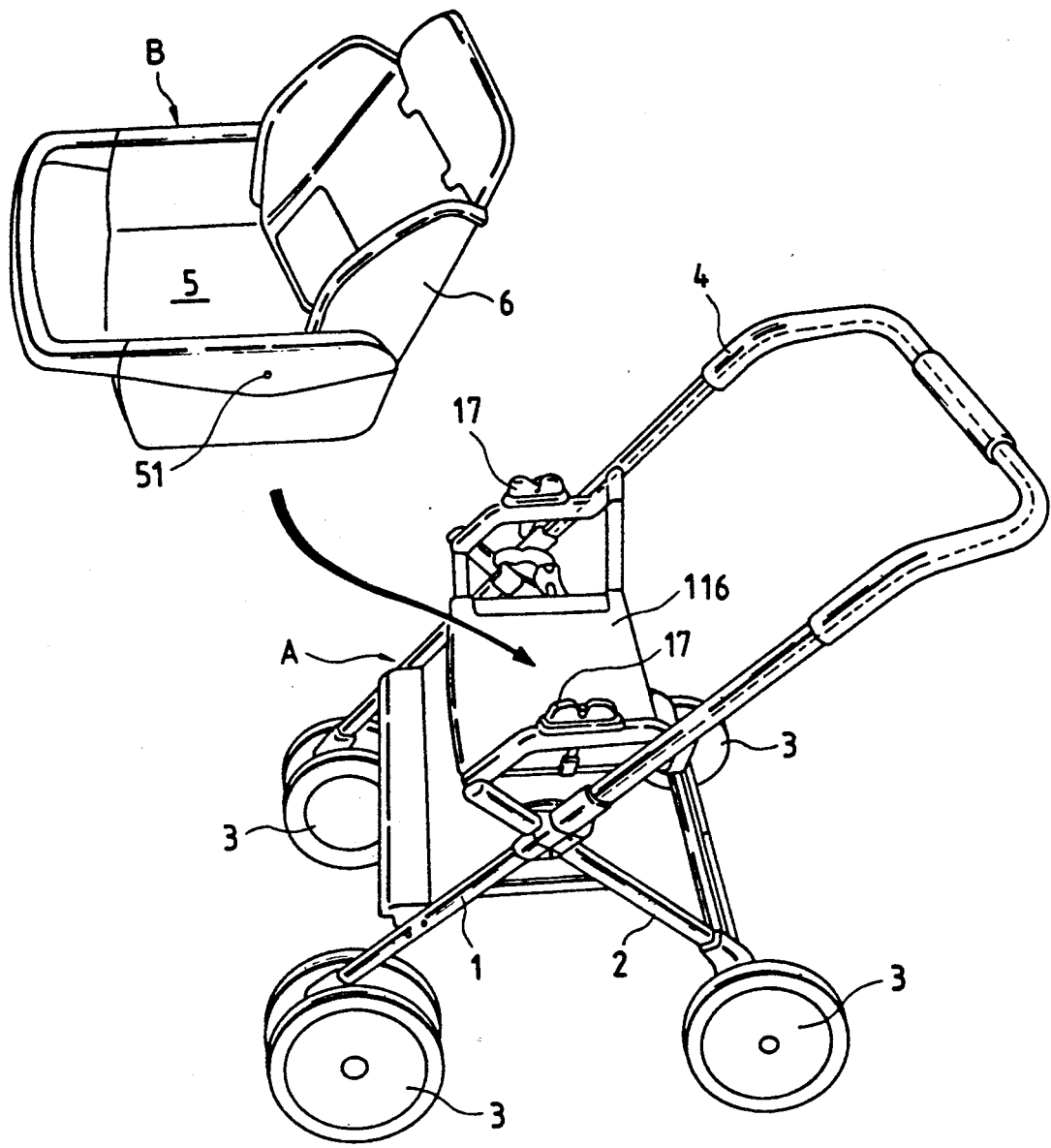
FIG. 2 is a perspective view of a seat portion and a main body of the baby carriage according to the invention in which the main body and seat portion are separated from one another.
Figure 3:
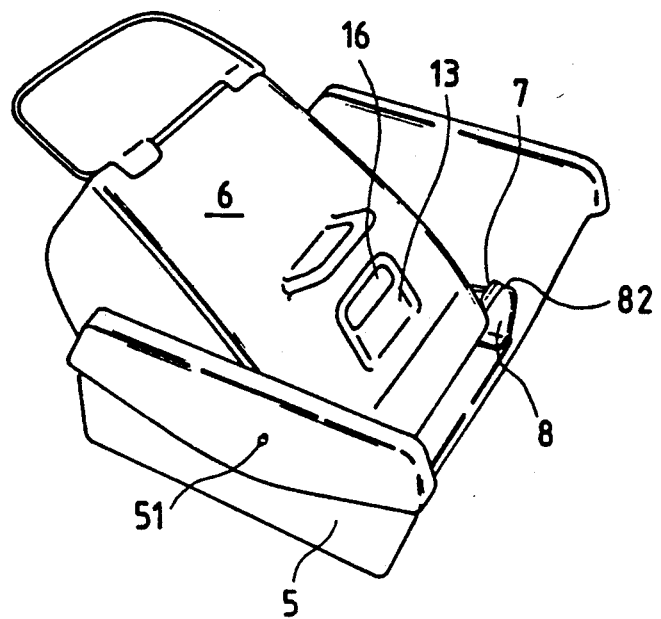
FIG. 3 is a perspective view of the seat portion showing a reclined state of the back rest according to the invention.

Before a reclining operation or a collapsing operation is performed, the end portions (outer ends) of the engaging rods 7 and 7 are fitted into proper ones of the fitting holes 81...81 for a reclining operation formed on the receiving plates 8 and 8 or engaged with the notch portions 82 for a folding operation, whereby the standing condition or the folded condition (collapsing condition) of the back rest 6 can be maintained. The standing condition is illustrated by the solid line portion in FIG. 1 and FIG. 2 and by a two dot chain portion in FIG. 4. The folded condition is shown in FIG. 3.

When it is desired to make the back rest 6 in the fixed condition or to collapse from that condition, the upper end portion (a portion of the operating hole 16) is first held and pulled upward.

Since the two parallel fitting holes 15 and 15 are longitudinally formed on the swing operating plate 13 and the guiding protrusions 62 and 62 protruding on the back rest 6 are fitted into the fitting holes 15 and 15, the accurate upward and downward movement of the swing operating plate 13 is assured by using the guiding protrusions 62 and 62 as guides.

When the swing operating plate 13 is lifted in accordance with the above operation, the upper end portions of the operating links 10 and 10 with their central bent portions pivoted to the portions 11 and 11 are pulled upward.

Figure 7A:
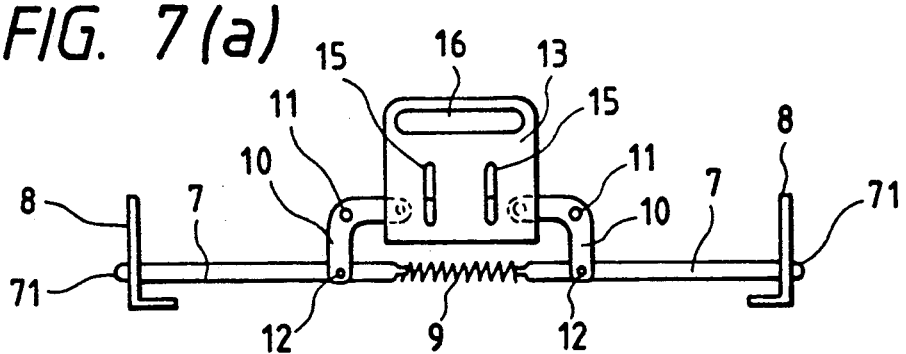
Figure 7B:
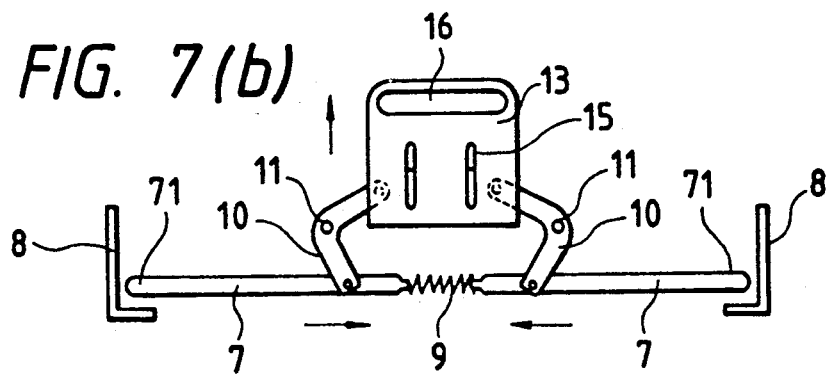

When the upper end portions of the operating links 10 and 10 which are L-shaped in configuration are pulled upward, the lower end portions of the operating links 10 and 10 formed integrally therewith are swung inward (toward the spring 9), so that the outer end portions of the operating links 10 and 10 are also retracted at the same time. As a result, the fitting of the engaging rods 7 and 7 into the fitting holes 81...81 for a reclining operation or the fitting thereof into the notch portions 82 for a folding operation is released. (See FIG. 7(b)).

When fitting the end portions of the engaging rods 7 and 7 into the fitting holes 81 and 81 for a reclining operation or the fitting thereof into the notch portions 82 for a folding operation is released, there is no means for maintaining the standing condition or the collapsing condition of the back rest 6. The back rest 6 is, therefore, moved to either one of the standing direction and a collapsing direction under this condition and then, the pulling upward movement of the swing operating plate 13 is released.

When the pulling upward movement of the swing operating plate 13 is released, the force which tends to pull back the engaging rods 7 and 7 is eliminated, so that the engaging rods 7 and 7 are energized so as to be pressed outward again by the resilient force of the spring 9.

Since there is no fitting hole 81...81 for a reclining operation or notch portion 82 for a folding operation on the faces of receiving plates 8 on which the end portions of the engaging rods 7 and 7 abut under the above state (since the positions of the end portions of the engaging rods 7 and 7 are dislocated from positions where the fitting holes 81 for a reclining operation are bored or positions where the notch portions 82 for a folding operation are formed), only the end portions of the engaging rods 7 and 7 abut on the faces of the receiving plates 8.

When the back rest 6 is swung toward either one of the desired directions of standing and collapsing, the reclining mechanism attached to the lower end portion of the back rest 6 is also swung simultaneously. When the positions of the end portions of the engaging rods 7 and 7 correspond to those where the fitting holes 81...81 for a reclining operation are bored or to those where the notch portions 82 for a folding operation are formed during the swinging thereof, the end portions of the engaging rods are fitted and engaged into the fitting holes or the notch portions.

If it is desired to move, for example, the fixed position of the back rest 6 from a standing position to a completely collapsing position (or vice versa) at one stroke, the swing operating plate 13 is moved to a desired position while the pulling upward movement thereof is not released. Then, the pulling upward movement of the swing operating plate is released at the desired position, the engagement of the engaging rods with the fitting holes is effected similarly to the above.

Since the mechanism for a reclining operation is formed inside the back rest 6, the seat portion B can be simply and can be freely reclined or operated for folding or accommodating without being influenced by the construction of the main body A of the baby carriage.

Since the fitting holes 81 . . . 81 for a reclining operation as well as the notch portions 82 for a folding operation are formed on the receiving plates 8, and the engaging rods 7 and 7 are fitted into the fitting holes 81 . . . 81 for a reclining operation or into the notch portions 82 for a folding operation, the back rest 6 is simply made collapsible to a folded and accommodated position prior to the folding operation of the main body A. A baby carriage provided with a structure that the seat portion B is separated from the main body A can be advantageously folded to a compact form.

Since the mechanism for a reclining operation is accommodated inside of the back rest 6 and covered so as not to be exposed to the outside, a user or a baby are not injured due, for example, to placing their fingers in contact with the mechanism. Thus, baby carriage can be safely operated.

Since the two engaging rods 7 and 7 are normally pressed outward by the force of the spring 9, an operator for performing a reclining operation need only lift the swing operating plate 13 at the start of the operation. After that, the swing operating plate 13 may be released so that the engaging rods 7 and 7 automatically returns to the original positions to be fitted into the fitting holes 81 and 81. Accordingly the mechanism according to the present invention is simply to operate.

Further, since all reclining operations can be carried out with one hand, the mechanism of the present invention is convenient to operate.

In addition, since mechanisms, other than the swing operating plate 13, are not exposed on the back face of the back rest 6, this back face portion can be conveniently employed for a mounting portion of an article such as a storing bag or the like.

Finally, since only a small part of the upper end portion of the swing operating plate 13 is exposed on the lower end portion of the back face of the back rest 6, a good appearance is provided.

What is claimed is:

1. A baby carriage, comprising:
   a seat portion including a seat floor and a back rest disposed at a rear portion of the seat floor; and
   a mechanism comprising a pair of operating links, each having a central portion which is swingably pivoted to a lower end of the back rest,
   engaging rods pivoted to ends of said operating links such that said engaging rods swing in a horizontal direction in accordance with a swinging operation of said operating links,
   several spaced fitting holes, disposed on both ends of the seat floor, for selectively receiving ends of said engaging rods so as to provide a reclining operation of the seat portion,
   a swing operating plate, said swing operating plate being attached to a lower end portion of the back rest so as to be manually lifted, and respective upper ends of said two operating links being pivoted to the swing operating plate, and
   a pair of receiving plates, wherein each of said receiving plates includes the several spaced fitting holes, wherein each of said receiving plates further has a notch portion for selectively receiving ends of the engaging rods so as to provide a folding operation of the seat portion, wherein said mechanism further includes a spring interposed between upper side ends of said engaging rods, and wherein said swing operating plate is manually moveable through the back rest such that an upper half portion of said swing operating plate is located at a back face side of the back rest, and a lower half portion of said swing operating plate is located inside the back rest.

2. The baby carriage as defined in claim 1, wherein the back rest includes guiding protrusions, and wherein said swing operating plate has two fitting holes which are parallel to each other and which receive said guiding protrusions so that said swing operating plate can be accurately moved in upward and downward directions.

3. The baby carriage as defined in claim 1, further comprising a main body portion, and wherein said seat portion is removably attached to said main body portion.

4. The baby carriage as defined in claim 1, wherein each of said operating links has an L-shape.

5. A mechanism for a seat portion of a baby carriage, the seat portion including a seat floor and a back rest disposed at a rear portion of the seat floor, the mechanism comprising:
   a pair of operating links, each having a central portion which is swingably pivoted to a lower end of a central portion disposed inside of the back rest;
   engaging rods pivoted to ends of said operating links such that said engaging rods swing in a horizontal direction in accordance with a swinging operation of said operating links;
   a pair of receiving plates respectively disposed on both ends of the seat floor, each of said receiving plates having several spaced fitting holes for selectively receiving ends of said engaging rods so as to provide a reclining operation of the seat portion; and
   a swing operating plate attached to a lower end portion of the back rest so as to be freely lifted, upper ends of said two operating links being pivoted to the swing operating plate;
   wherein each of said receiving plates further has a notch portion for selectively receiving ends of the engaging rods so as to provide a folding operation of the seat portion, and wherein said mechanism further includes a spring interposed between upper side ends of said engaging rods;
   wherein said swing operating plate is moveable through the back rest such that an upper half portion of said swing operating plate is located at a back face side of the back rest, and a lower half portion of said swing operating plate is located inside the back rest.

* * * * *